(12) United States Patent
Min et al.

(10) Patent No.: US 8,666,567 B2
(45) Date of Patent: Mar. 4, 2014

(54) SYSTEMS AND METHODS FOR CONTROLLING THE SPEED OF AN AIRCRAFT

(75) Inventors: Deuk Gi Min, Peoria, AZ (US); Jim Rumbo, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 313 days.

(21) Appl. No.: 13/077,375

(22) Filed: Mar. 31, 2011

(65) Prior Publication Data

US 2012/0253557 A1    Oct. 4, 2012

(51) Int. Cl.
*G06F 19/00* (2011.01)

(52) U.S. Cl.
USPC ............................... 701/3; 701/16; 701/14

(58) Field of Classification Search
USPC ............ 701/3, 16, 14; 703/2; 244/75.1, 12.3, 244/10, 2, 111, 45 A, 213, 218, 46, 183; 303/126; 188/264 R; 73/178 T
See application file for complete search history.

(56) References Cited

U.S. PATENT DOCUMENTS

| | | | |
|---|---|---|---|
| 3,447,765 A | 6/1969 | Doniger et al. | |
| 4,357,661 A | 11/1982 | Lambregts et al. | |
| 4,633,404 A | 12/1986 | Greeson et al. | |
| 4,709,336 A | 11/1987 | Zweifel | |
| 4,750,127 A * | 6/1988 | Leslie et al. | 701/16 |
| 4,825,374 A | 4/1989 | King et al. | |
| 5,495,999 A * | 3/1996 | Cymara | 244/45 A |
| 6,819,266 B2 | 11/2004 | Greene | |
| 7,647,140 B2 | 1/2010 | Demortier et al. | |
| 2005/0040286 A1* | 2/2005 | Radford | 244/111 |
| 2005/0242234 A1* | 11/2005 | Mahmulyin | 244/75.1 |

FOREIGN PATENT DOCUMENTS

GB           2444742 A    6/2008

* cited by examiner

*Primary Examiner* — Behrang Badii
(74) *Attorney, Agent, or Firm* — Ingrassia Fisher & Lorenz, P.C.

(57) ABSTRACT

A system is provided for controlling the speed of an aircraft with a speed brake during flight. The system includes a guidance system configured to determine a target speed for the aircraft; a speed brake control system coupled to the guidance system and configured to compare the target speed to a current speed to generate speed brake guidance; and a display unit coupled to the speed brake control system and configured to display a visual representation of the speed brake guidance to a pilot of the aircraft.

19 Claims, 8 Drawing Sheets

SYSTEMS AND METHODS FOR CONTROLLING THE SPEED OF AN AIRCRAFT

TECHNICAL FIELD

The present invention generally relates to aircraft systems and methods, and more particularly relates to the systems and methods for controlling the speed of an aircraft.

BACKGROUND

Modern commercial aircraft make extensive use of systems to plan and execute flights, control the aircraft, and manage a number of other aircraft operations. For example, such systems may include a flight management system (FMS) that generates flight plans with lateral segments and vertical segments to a destination. The flight plans may include details about the appropriate speeds, altitudes, and positions during ascent, cruising, and descent modes of a flight. As an example, the FMS may chart a vertical descent segment at a target speed. If conditions change or if the descent segment is not flown as expected, the aircraft may be above or below the target speed. In such a scenario, the pilot will adjust the thrust or engage a speed brake in an attempt to meet the target speed. Pilots generally make these adjustments based on experience or intuition. Given the complex mechanisms of flight, at times, the pilot may overcompensate or undercompensate an attempt to hit the target speed, particularly with respect to the application of the speed brake. If the pilot applies too much speed brake and the aircraft speed falls beneath the target speed, the pilot must then engage the thrust in an attempt to again meet the target speed, and so on, until the aircraft finally reaches the target speed. This procedure for meeting target speeds may not provide the most efficient flight operation.

Accordingly, it is desirable to provide improved systems and methods for controlling the speed of an aircraft, particularly during descent. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system is provided for controlling the speed of an aircraft with a speed brake during flight. The system includes a guidance system configured to determine a target speed for the aircraft; a speed brake control system coupled to the guidance system and configured to compare the target speed to a current speed to generate speed brake guidance; and a display unit coupled to the speed brake control system and configured to display a visual representation of the speed brake guidance to a pilot of the aircraft.

In accordance with another exemplary embodiment, a method is provided for controlling the speed of an aircraft with a speed brake. The method includes receiving a current speed; comparing the current speed to a target speed; generating speed brake guidance based on the comparison; and displaying the speed brake guidance to a pilot for controlling the speed of the aircraft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein include aircraft systems and methods for controlling an aircraft during flight. Particularly, the system and methods are applicable to an aircraft flying a vertical descent segment with a target speed. The systems and methods may compare the current speed to the target speed, and if the current speed is greater than the target speed, the system and method may generate speed brake guidance corresponding to the appropriate amount of speed brake needed to reach the target speed. The speed brake guidance may include a speed brake recommendation that may be communicated to the pilot for manual application of the speed brake and/or a speed brake command that may be automatically implemented at the speed brake.

Figure 1:
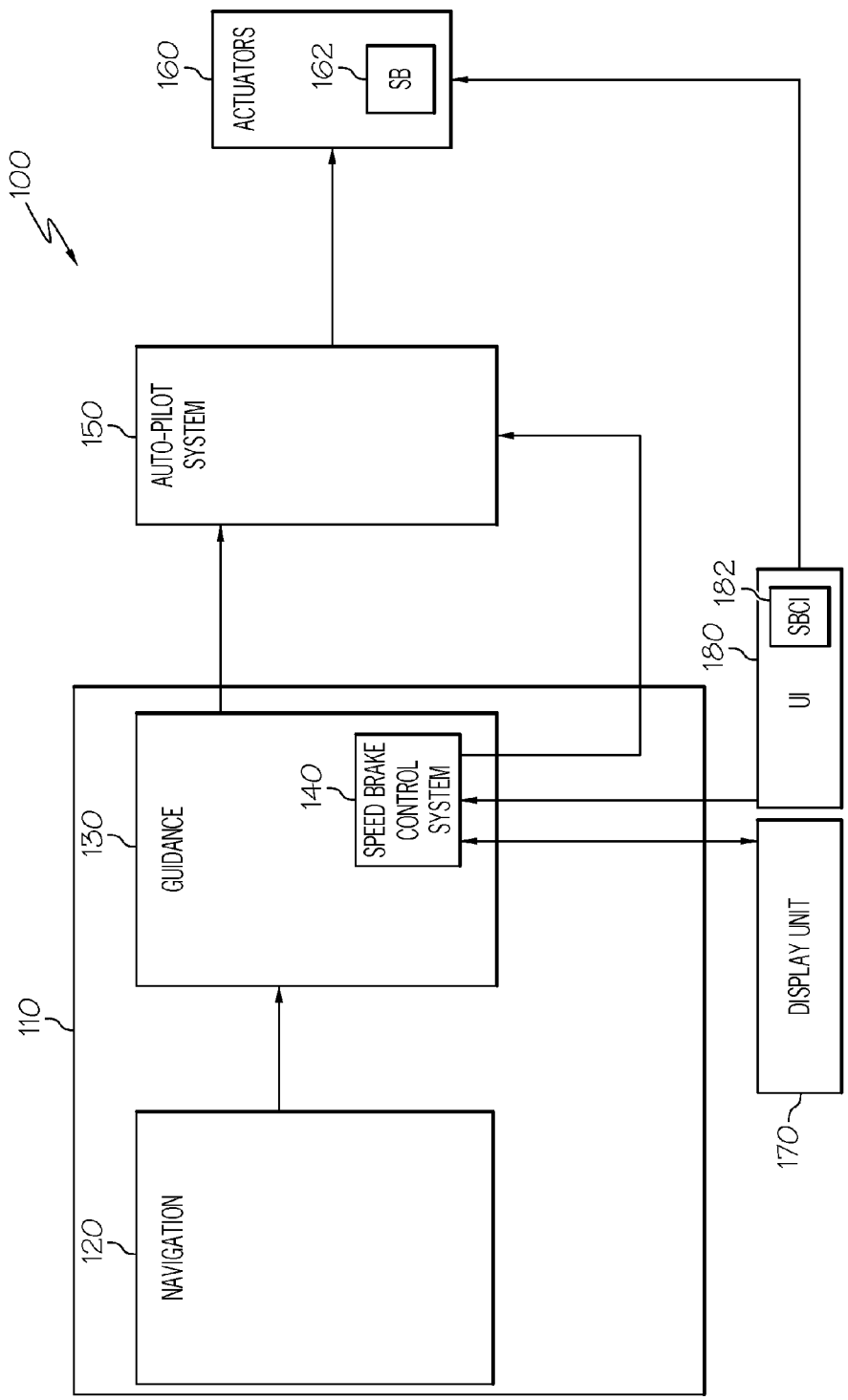
FIG. 1 is a block diagram of an aircraft system for controlling the flight of the aircraft in accordance with an exemplary embodiment.

FIG. 1 is a schematic block diagram of an aircraft system 100 for controlling the flight of an aircraft in accordance with an exemplary embodiment. In the illustrated embodiment, the aircraft system 100 includes a flight management system (FMS) 110, an auto-pilot system 150, aircraft actuators 160, a display unit 170, and a user interface 180. As described in greater detail below, the FMS 110 includes a navigation system 120 and a guidance system 130 with a speed brake control system 140. The system 100 is particularly discussed as a method and system for controlling a speed brake during a vertical descent segment with a target speed, although the exemplary embodiments discussed herein are equally applicable to other flight segments and scenarios.

Notably, it should be understood that although system 100 appears in FIG. 1 to be arranged as an integrated system, the exemplary embodiments are not so limited and can also include an arrangement whereby one or more of the components are separate components or subcomponents of another system located either onboard or external to an aircraft. Furthermore, the systems and methods are not limited to manned aircraft and can also be implemented for other types of vehicles, such as, for example, spacecraft or unmanned vehicles. The components of the system 100 are introduced below prior to a more detailed description of the speed brake control system 140.

The FMS 110 generally performs a wide variety of in-flight tasks during operation of the aircraft, including navigation and guidance of the aircraft respectfully implemented by the navigation system 120 and the guidance system 130. Although not specifically shown, the FMS 110, including the navigation system 120 and guidance system 130, may be implemented with one or more computer processors, such as for example, a microprocessor or digital signal processor capable of performing the functions discussed herein. The FMS 110 may further include a database with any element necessary for the operation of the aircraft and creation of a flight plan, including waypoints, airports, terrain information and applicable flight rules.

In general, the navigation system 120 determines the current kinematic state of the aircraft. As such, in the exemplary embodiment, the navigation system 120 includes any suitable position and direction determination devices, such as an inertial reference system (IRS), an air-data heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, and any desired flight information.

In general, the guidance system 130 constructs lateral and vertical profiles for various segments that make up a flight plan based on navigation information received from the navigation system 120 (e.g., the current position and velocity) and inputs from the pilot or other source (e.g., the desired destination). In one scenario, the vertical descent profile of the flight plan may be dictated by Air Traffic Control (ATC) or the Federal Aviation Administration (FAA) rules. As such, the guidance system 130 includes any suitable algorithms or decision modules sufficient to construct a flight plan.

Figure 2:
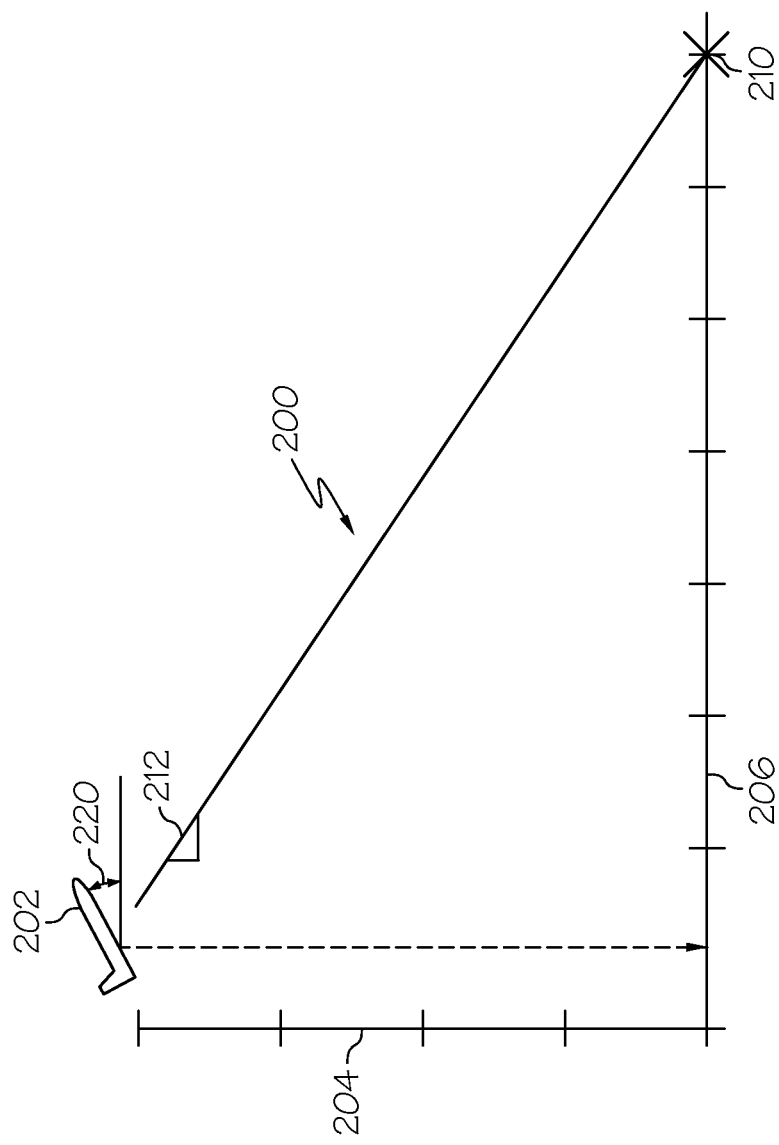
FIG. 2 is an exemplary vertical profile of a flight plan generated by the aircraft system of FIG. 1.

As an example, FIG. 2 illustrates a vertical descent profile 200 for an aircraft 202 flying to a destination 210, which in this scenario is an airport for landing. The vertical descent profile 200 indicates the altitude 204 and flight path angle 212 that the aircraft 202 should fly at various distances 206 from the destination 210 as part of the flight plan. For example, the vertical descent profile 200 may be the approved approach procedure for a particular airport under certain conditions. The vertical descent profile 200 in this embodiment is constant, indicating that the aircraft 202 is descending at a relatively constant angle. In other embodiments, the rate of descent may vary such that the vertical descent profile 200 has multiple portions, e.g., different flight path angles at different portions of the vertical descent profile 200. The vertical descent profile 200 includes a particular pitch angle 220, roll angle (not shown), and pitch rate of change (not shown) set by the pilot or the auto-pilot system 150 (FIG. 1), discussed below.

Within the applicable requirements (e.g., FAA or ATC requirements and the like), the guidance system 130 (FIG. 1) generally attempts to construct a vertical descent profile 200 that can be flown with an idle thrust to improve the fuel economy of the flight. As such, in ideal conditions, the aircraft would fly the vertical descent profile 200 with as little engine power or drag requirements as possible.

Figure 3:
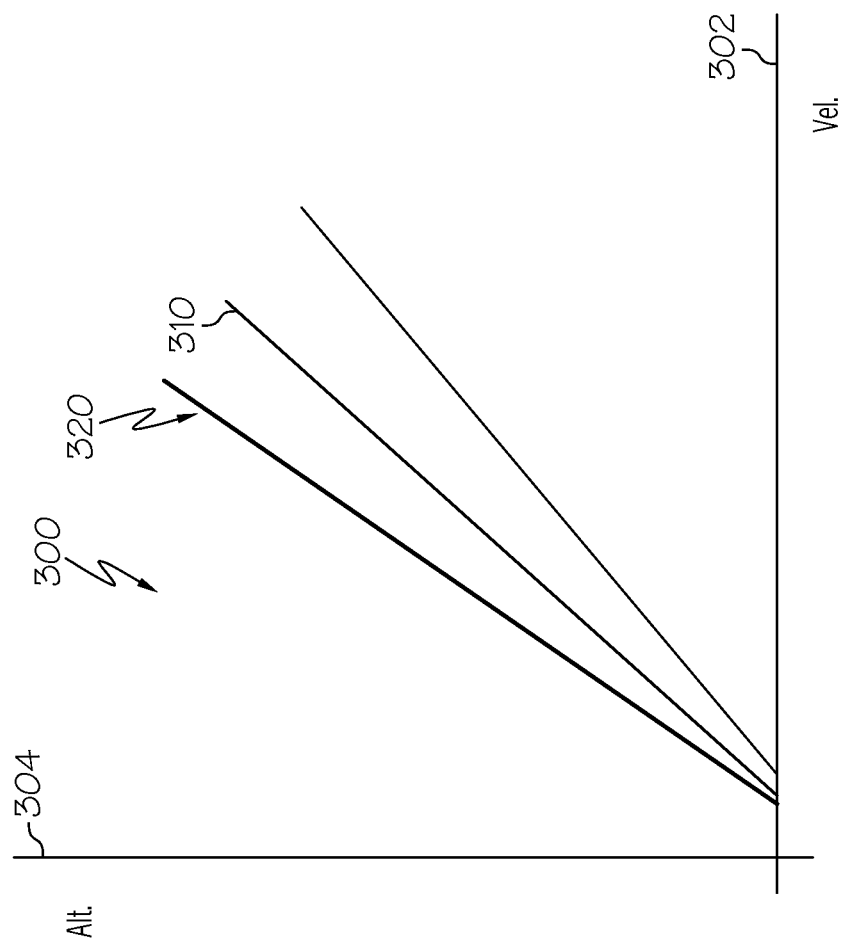
FIG. 3 is an exemplary speed profile associated with the vertical profile of FIG. 2.

As noted above, the flight plan designates both altitude and speed of the aircraft as it approaches the destination. Accordingly, FIG. 3 depicts a speed profile 300 corresponding to the vertical descent profile 200 of FIG. 2 to illustrate the speed at which the aircraft should be flying at each of the altitudes of the flight plan as the aircraft decelerates to the destination. The speed profile 300 particularly depicts speed on the horizontal axis 302 as a function of altitude on the vertical axis 304. The speed profile 300 includes both a target speed 310 and a speed envelope 320 with upper and lower limits. As discussed above, the target speed 310 and the speed envelope 320 may be based on constraints, such as speed limit altitude constraints. During operation, the FMS 110 (FIG. 1) or the pilot attempts to maintain the current speed of the aircraft at the target speed 310, particularly within the speed envelope 320, when flying the vertical descent profile 200 (FIG. 2).

Returning to FIG. 1, the guidance system 130 constructs the flight plan according to the desired destination and provides commands to the auto-pilot system 150 for implementation of the flight plan. The commands generated by the guidance system 130 associated with the flight plan may include a pitch command, a pitch rate command, a roll command, and a speed guidance that function to implement the lateral and vertical profiles of the flight plan. As described in greater detail below, the speed brake control system 140 also generates speed brake guidance to more efficiently implement the vertical profile of the flight plan, either by the pilot or auto-pilot system 150.

The auto-pilot system 150 generally receives the guidance commands from the guidance system 130 for automatically implementing the flight plan. In response, the auto-pilot system 150 generates actuator commands that function to control the flight characteristics of the aircraft via the actuators 160. As examples, the actuator commands generated by the auto-pilot system 150 include elevator commands, aileron commands, rudder commands, speed brake commands, and throttle commands. As described below, the auto-pilot system 150 may also receive speed brake commands from the speed brake control system 140.

The actuators 160 collectively include one or more aircraft components that, when controllably positioned, guide the movement of the aircraft, including the flight surfaces and associated drive components. As described above, the position of the actuators 160 are controlled by the commands of the auto-pilot system 150 or by commands from the pilot via the user interface 180. The number and type of actuators 160 included in an aircraft may vary. As examples, the actuators 160 may include elevators for adjusting the pitch of the aircraft, ailerons for adjusting the roll of the aircraft, and a rudder for adjusting the yaw of the aircraft respectively controlled according to the elevator commands, aileron commands, and rudder commands from the auto-pilot system 150 or from the pilot. The actuators 160 further include a throttle that adjusts the speed of the aircraft by respectively increasing or decreasing power to the engine according to the throttle commands from the auto-pilot system 150 or the pilot.

As particularly shown in FIG. 1, the actuators 160 include a speed brake 162 that adjusts the speed of the aircraft by increasing or decreasing the drag on the aircraft. For example, the speed brake 162 may include one or more adjustable spoilers that are selectively deployed to provide the desired amount of drag. In one exemplary embodiment, the spoilers of the speed brake 162 may be selectively pivoted at an angle about an axis generally perpendicular to the direction of flight such that when the spoilers are closed (or at 0°), no drag occurs at the spoilers, and when the spoilers are completely open (or at 90°), the full amount of drag is applied. When the speed brake 162 is partially applied, such as when the spoilers are partially open (or between 0° and 90°), a partial amount of drag is provided. Although a setting of 90° is described as "completely open," in some embodiments, the extent of opening that corresponds to maximum drag or 100% application of the speed brake 162 is less than 90°, such as about 45° or about 50°. As such, the speed brake 162 may be adjusted to provide the desired amount of drag. As described in greater detail below, speed brake guidance generated by the speed brake control system 140 corresponds to the amount of recommended drag and the amount of speed brake 162 to be applied that corresponds to that recommended drag. Although the speed brake 162 is described as spoilers, any combination of components that apply drag to the aircraft may individually or collectively be considered as a speed brake.

The system 100 additionally includes the display unit 170. The display unit 170 may include any suitable device or apparatus capable of displaying various types of computer generated symbols and information. As described below, the display unit 170 is any mechanism capable of displaying speed brake guidance for the pilot.

Suitable examples of the display unit 170 may include various CRT or flat panel display systems, such as LCDs, OLED displays, projection displays, plasma displays, HDDs, HUDs, and the like. The display unit 170 may be a dedicated display unit for the speed brake guidance or part of a multi-functional display unit, such as a primary flight display or mode control unit. Further examples of the display unit 170 are described below.

The pilot or flight crew may initiate and modify the flight plan or flight commands of the guidance system 130 via the user interface 180. For example, the pilot may manually input a target speed or speed command at the user interface 180. The user interface 180 may include any suitable hardware and software components that enable the pilot to interface with the system 100. Such components may include keyboards, mouse devices, buttons, switches, levers, and knobs. As particularly shown, the user interface 180 includes a speed brake control interface 182 that enables the pilot to engage the speed brake control system 140 or the speed brake 162 directly. Particularly, the speed brake control interface 182 enables the pilot to manually adjust the speed brake 162. The speed brake control interface 182 is typically a lever that may be pivoted from an initial (or first) position, at which the speed brake 162 is not engaged, to a final (or second) position, at which the speed brake 162 is fully engaged. Such a lever may also be positioned between those two points (e.g., at an intermediate position) to partially engage the speed brake at a desired amount. Accordingly, the position of the speed brake control interface 182 enables the pilot to apply a selected amount of speed brake 162, and thus drag, to the aircraft.

Now that the components of the aircraft system 100 have been generally described, the speed brake control system 140 will be described in greater detail. As described above, the speed brake guidance generated by the speed brake control system 140 is an indication of the amount of speed brake necessary to meet the target speed (e.g., target speed 310 of FIG. 3), which may be expressed as a command or as a recommendation.

As described above, the speed brake control system 140 is part of the guidance system 130 and generally functions to determine the appropriate amount of drag applied by the speed brake 162 to maintain or reach a target speed associated with the speed profile (e.g., the speed profile 300 of FIG. 3). As such, the speed brake control system 140 generally considers the current speed of the aircraft and the target speed of the flight plan, and if the current speed is greater than the target speed, the speed brake control system 140 generates the speed brake control guidance as a recommendation of the appropriate amount of speed brake necessary for efficiently reaching the target speed. The speed brake recommendation may be displayed to the pilot for implementation at the speed brake control interface 182. In one exemplary embodiment, the speed brake control system 140 generates the display control signals associated with the speed brake recommendation for rendering on the display unit 170. In other embodiments, the speed brake control system 140 provides the speed brake recommendation to the display unit 170 for generation of the display control signals and subsequent display.

Optionally, the speed brake guidance from the speed brake control system 140 may also include a speed brake command to be automatically implemented by the auto-pilot system 150 or by the speed brake 162 itself. The implementation of the speed brake control system 140 is described in greater detail with reference to FIGS. 7-9. As described below, the speed brake guidance may be calculated by the speed brake control system 140 from drag models and/or based on experimental data that relates speed deviations to the position of the speed brake 162 and/or directly to the position of the speed brake control interface 182.

The speed brake guidance, particularly the speed brake recommendation, generated by the speed brake control system 140 may be conveyed to the pilot in any suitable manner. For example, the speed brake recommendation may be expressed as a percentage, whereby 0% indicates that no speed brake 162 should be applied and 100% indicates that the speed brake 162 should be fully deployed. In one exemplary embodiment, the speed brake recommendation is expressed as a function of the speed brake control interface 182. For example, if the speed brake control interface 182 is a lever and the speed brake recommendation is 50%, the lever of the speed brake control interface 182 should be adjusted to about halfway between the position of no speed brake and the position of full speed brake. The speed brake recommendation may also be associated with a corresponding scale of labeled incremental value on the speed brake control interface 182. For example, if the speed brake control interface 182 is a lever with positions labeled or otherwise designated from 0 to 10, the speed brake recommendation may be a numerical value on this scale, e.g., a speed brake recommendation of 5 indicates that the lever should be in the number 5 position.

The speed brake recommendation may be rounded up or down into discrete values. For example, the speed brake recommendation may be output as one of 0%, 25%, 50%, or 100%, e.g., a calculated speed brake recommendation of 20% may be output as 25% for simplicity of interpretation or application. Such values may be output as numerical values or other representations, such as shown in FIGS. 4-6.

Figure 4:
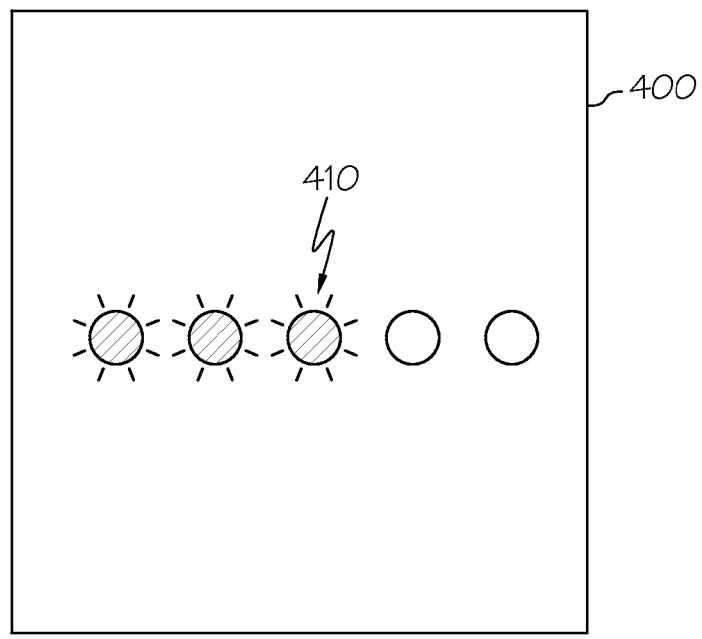
FIG. 4 is a display unit of the aircraft system of FIG. 1 for displaying speed brake guidance in accordance with an exemplary embodiment.
Figure 5:
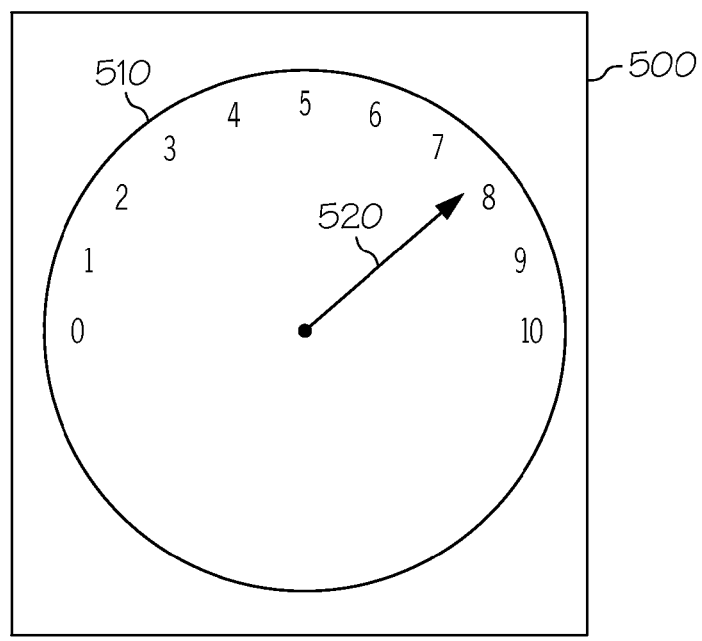
FIG. 5 is a display unit of the aircraft system of FIG. 1 for displaying speed brake guidance in accordance with another exemplary embodiment.
Figure 6:
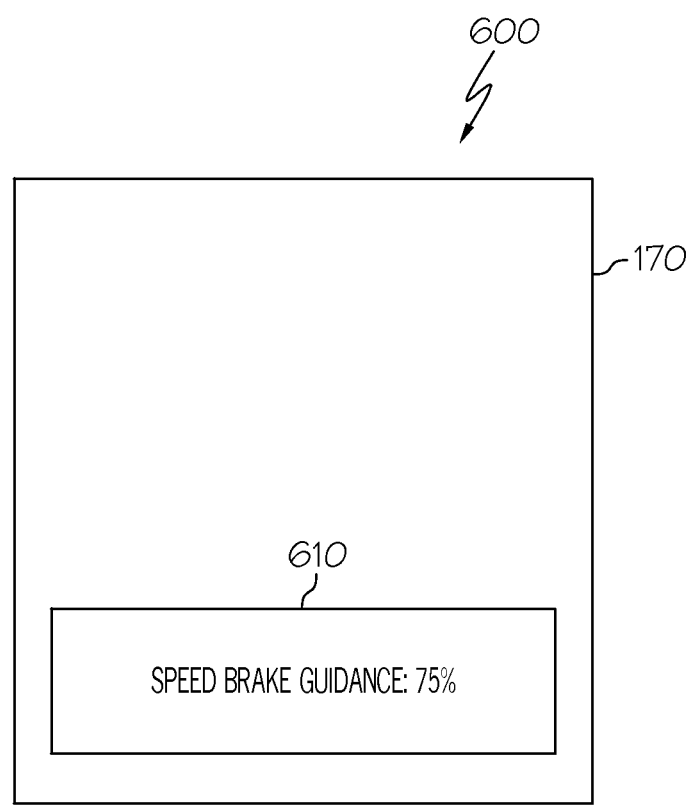
FIG. 6 is a display unit of the aircraft system of FIG. 1 for displaying speed brake guidance in accordance with another exemplary embodiment.

FIGS. 4-6 are exemplary representations 400, 500, and 600 of the speed brake recommendation of the speed brake guidance, which may be displayed to the pilot on the display unit 170 (FIG. 1). FIGS. 4-6 are three examples of mechanisms for representing the speed brake recommendation, but generally, any representation 400 that indicates to the pilot the appropriate amount of speed brake may be provided. The representation 400 of speed brake recommendation in FIG. 4 includes a series of five lights (e.g., LEDs) 410 that each represent a recommended speed brake application of 20%. For example, in FIG. 4, three of the lights 410 are illuminated, thereby indicating to the pilot that 60% (i.e., 3×20%) of the speed brake should be applied at the speed brake control interface 182 (FIG. 1). The representation 500 of speed brake recommendation in FIG. 5 includes an incremented dial 510 with a pointer 520 that indicates the recommended speed brake application. For example, in FIG. 5, the pointer 520 is pointing to a value of 8, thereby indicating to the pilot that a value of 8 should be applied on a corresponding labeled value scale at the speed brake control interface 182 (FIG. 1). In FIG. 6, the representation 600 of speed brake recommendation is provided in a scratch pad area 610 of the display unit 170, which in this embodiment is a multi-function control and display unit.

Figure 7:
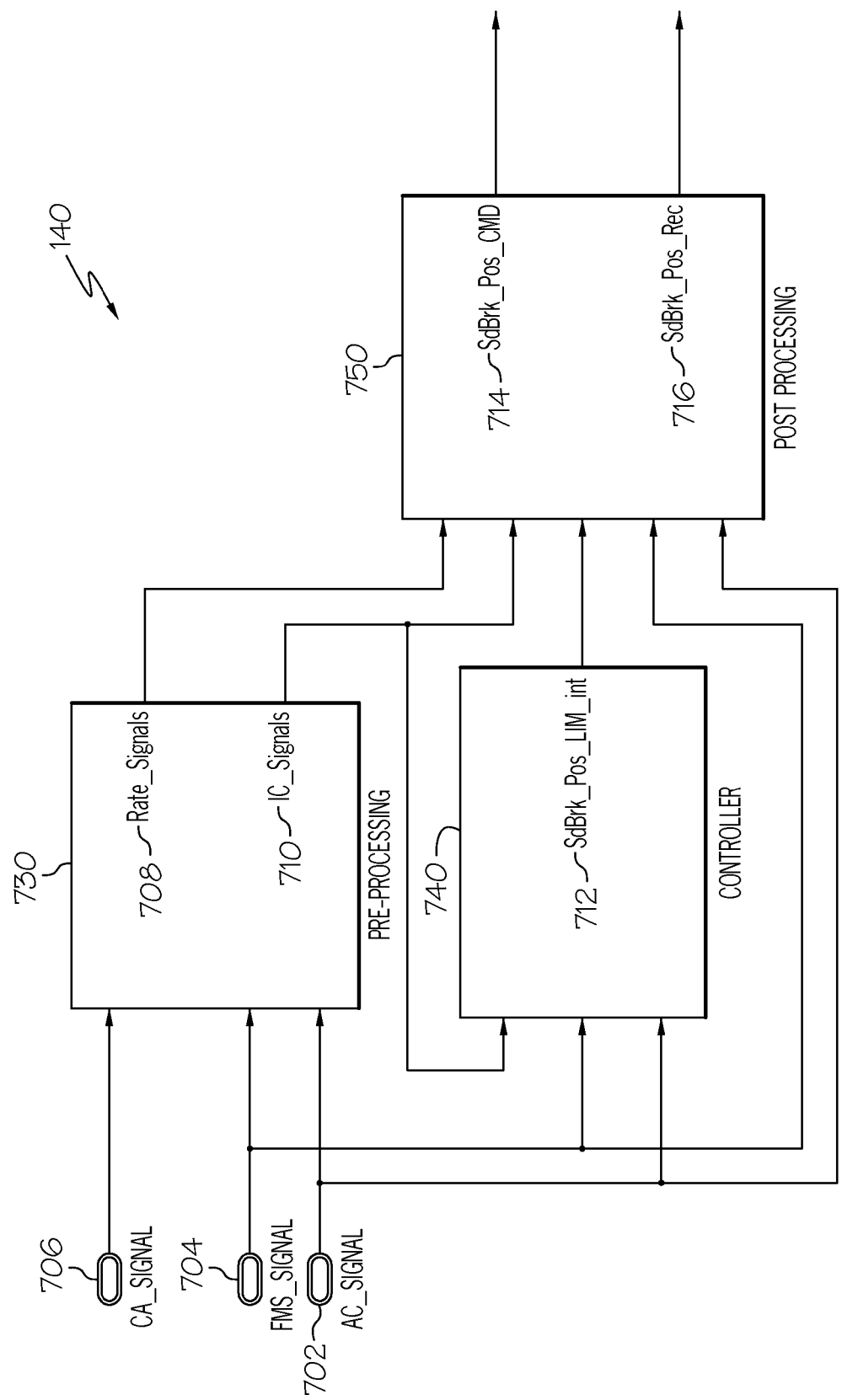
FIG. 7 is a block diagram of a speed brake control system of the aircraft system of FIG. 1 in accordance with an exemplary embodiment.

FIG. 7 is a schematic block diagram of a speed brake control system, such as the speed brake control system 140 of FIG. 1 that functions to adjust the speed brake 162 based on commands from the pilot or automatically based on the current state of the aircraft and the flight plan. In particular, the speed brake control system 140 generates speed brake guidance for efficiently achieving the target speeds of the flight plan. FIG. 1 is also referenced in the description below.

In the illustrated embodiment, the speed brake control system 140 includes a pre-processing module 730, a controller module 740, and a post-processing module 750. The implementation of the speed brake control system 140 discussed below is just one example of the generation of the speed brake guidance, and any suitable implementation may be provided. The speed brake control system 140 is described with respect to a number of modules 730, 740, and 750 (e.g., software, hardware, or combinations thereof). Specifically, each of the modules 730, 740, and 750 may be implemented to carry out specific functions. Accordingly, these modules 730, 740, and 750 may include processing units that execute machine instructions or algorithms stored in the database or local memory and retrieved and executed to perform the functions discussed herein. As such, the depicted example is provided as one exemplary embodiment.

The pre-processing module 730 receives a number of signals from the navigation system 120 as well as other components of the guidance system 130. In one exemplary embodiment, the pre-processing module 730 receives signals labeled as aircraft signals 702, which collectively may include various signals generally representing the current state of the aircraft, including one or more of the following: an enable signal for the speed brake control system 140; the current aircraft speed; a signal indicating the status of flaps; the current throttle resolver angle; and the current position of the speed brake 162. The pre-processing module 730 further receives signals labeled as FMS signals 704, which collectively may include various signals representing aspects of the flight plan, including one or more of the following: a signal indicating the altitude of the aircraft relative to the speed limit altitude; the target speed; the current flight path angle; signals indicating the pitch and thrust submodes; and vertical departure high speed limit signal. The pre-processing module 730 may further receive signals labeled as configurable attribute signals 706, which collectively may include various signals representing the points at which the speed brake control system 140 is activated or deactivated, including one or more of the following: a speed threshold for activating the speed brake control system 140 above the speed limit altitude; the speed threshold for deactivating the speed brake control system 140 above the speed limit altitude; the speed threshold for activating the speed brake control system 140 below the speed limit altitude; the speed threshold for deactivating the speed brake control system below the speed limit altitude; the altitude threshold for activating the speed brake control system 140 at idle thrust; the altitude threshold for activating the speed brake control system 140 at non-idle thrust; the threshold of the flight path angle for activating the speed brake control system 140; and the thrust mode indicator. The signals 702, 704, and 706 should not be considered limiting or exhaust, although particular types of signals are discussed below.

Figure 8:
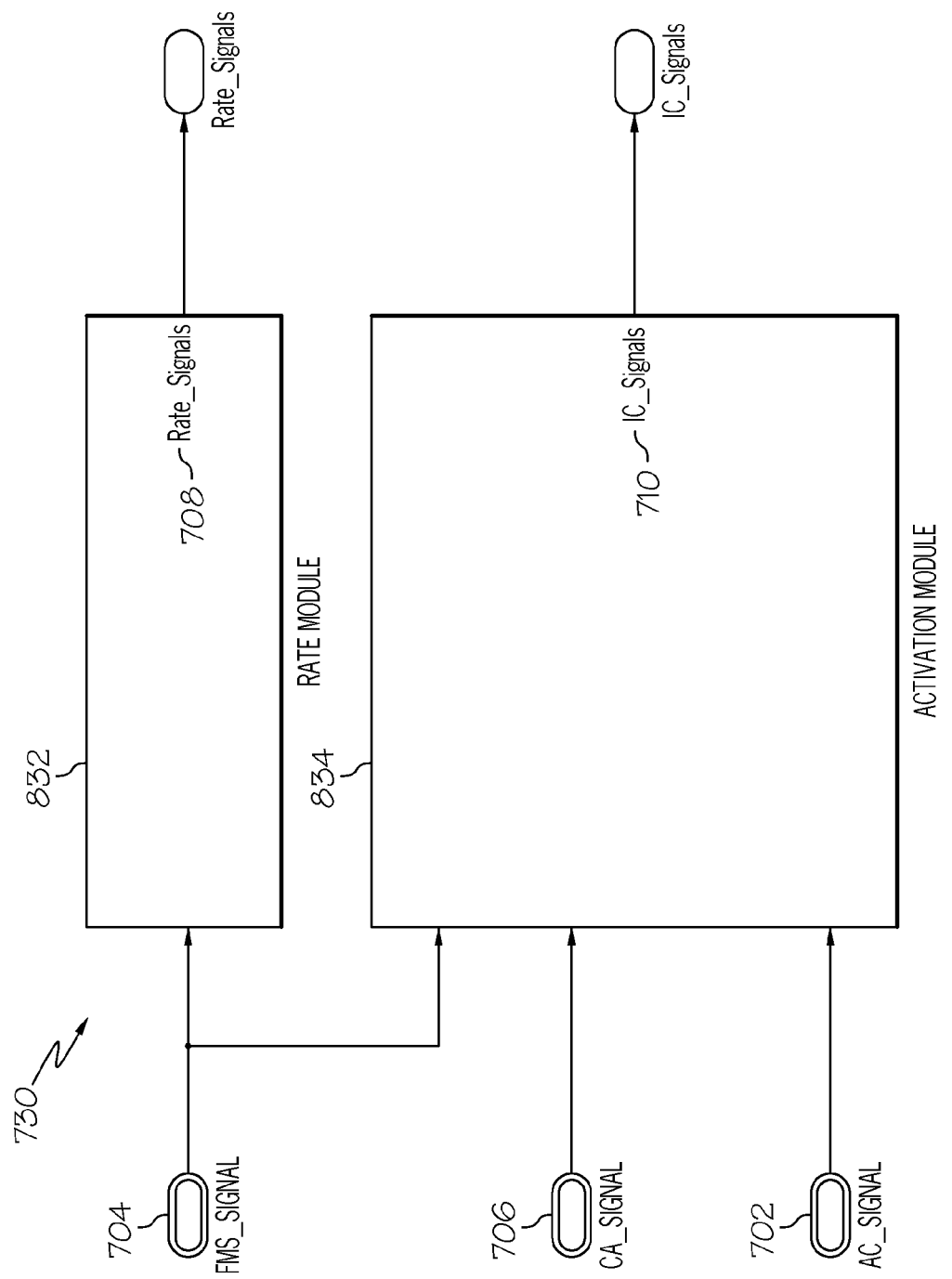
FIG. 8 is a block diagram of a pre-processing module of the speed brake control system of FIG. 7 in accordance with an exemplary embodiment.

The pre-processing module 730 is described in greater detail in FIG. 8, which is a more detailed block diagram of the pre-processing module 730 of FIG. 7. As shown in FIG. 8, the pre-processing module 730 includes a rate module 832 and activation module 834. The rate module 832 particularly receives at least some of the speed brake FMS signals 704 and produces rate limit signals 708 that indicate the speed brake position incremental rates, either up or down. As an example, the FMS signals 704 may include the flight path angle, from which the rate module 832 determines an appropriate rate or a rate limit at which the speed brake 162 may be applied. For example, the rate at which the speed brake 162 may be applied is greater for relatively large flight path angles than smaller angles. The rate module 832 may be implemented with control laws or algorithms that relate speed brake application rates with flight path angles and other aircraft characteristics.

The activation module 834 particularly receives at least some of the aircraft signals 702, the FMS signals 704, and the configurable attribute signals 706. In response, the activation module 834 generates initial condition signals 710 that include various signals, such as an enable signal that initializes the speed brake control system 140 for subsequent generation of the speed brake guidance discussed below. The activation module 834 may generate the initial condition signals 710 based on a comparison of the speed brake aircraft signals 702 (e.g., velocity and altitude) with the various thresholds of the configurable attribute signals 706 (e.g., velocity and altitude thresholds). Other signals that may be generated by the activation module 834 as part of the initial condition signals 710 may include a hold computation for subsequent iterations and conditions for retracting the speed brake 162.

Referring again to FIG. 7, the initial condition signals 710 from the pre-processing module 730 are inputs to the controller module 740. The controller module 740 further receives the aircraft signals 702 and the FMS signals 704. The controller module 740 processes the initial condition signals 710, the aircraft signals 702, and the FMS signals 704 to generate initial speed brake position guidance signals 712 associated with the speed brake 162. For example, when the initial condition signals 710 indicate that the speed brake control system 140 has been enabled, the controller module 740 may generate the initial position guidance signals 712 by comparing the current speed (e.g., provided as part of the aircraft signals 702) to the speed profile (e.g., speed profile 300 of FIG. 3 and provided as part of the FMS signals 704) to identify any deviations. The controller module 740 includes algorithms, control laws, or models that relate these deviations to the necessary or recommended amount of speed brake 162. The initial position guidance signals 712 may be based on aircraft characteristics, calculated based on drag models, and/or based on experimental data. As one example, the controller module 740 may include a look-up table that relates target speed deviation to the recommended position of the speed brake control interface 182, and thus, the recommended application of the speed brake 162. Although the speed brake control system 140 may continuously generate speed brake guidance based on updates to the various incoming signals, the controller module 740 may further include some amount of damping to enable the aircraft to react to changes in the application of the speed brake 162.

The post-processing module 750 receives the initial position guidance signals 712 from the controller module 740; the rate limit signals 708 and the initial condition signals 710 from the pre-processing module 730; the aircraft signals 702; and the FMS signals 704. The post-processing module 750 is described in greater detail in FIG. 9, which is a more detailed block diagram of the post-processing module 750 of FIG. 7.

Figure 9:
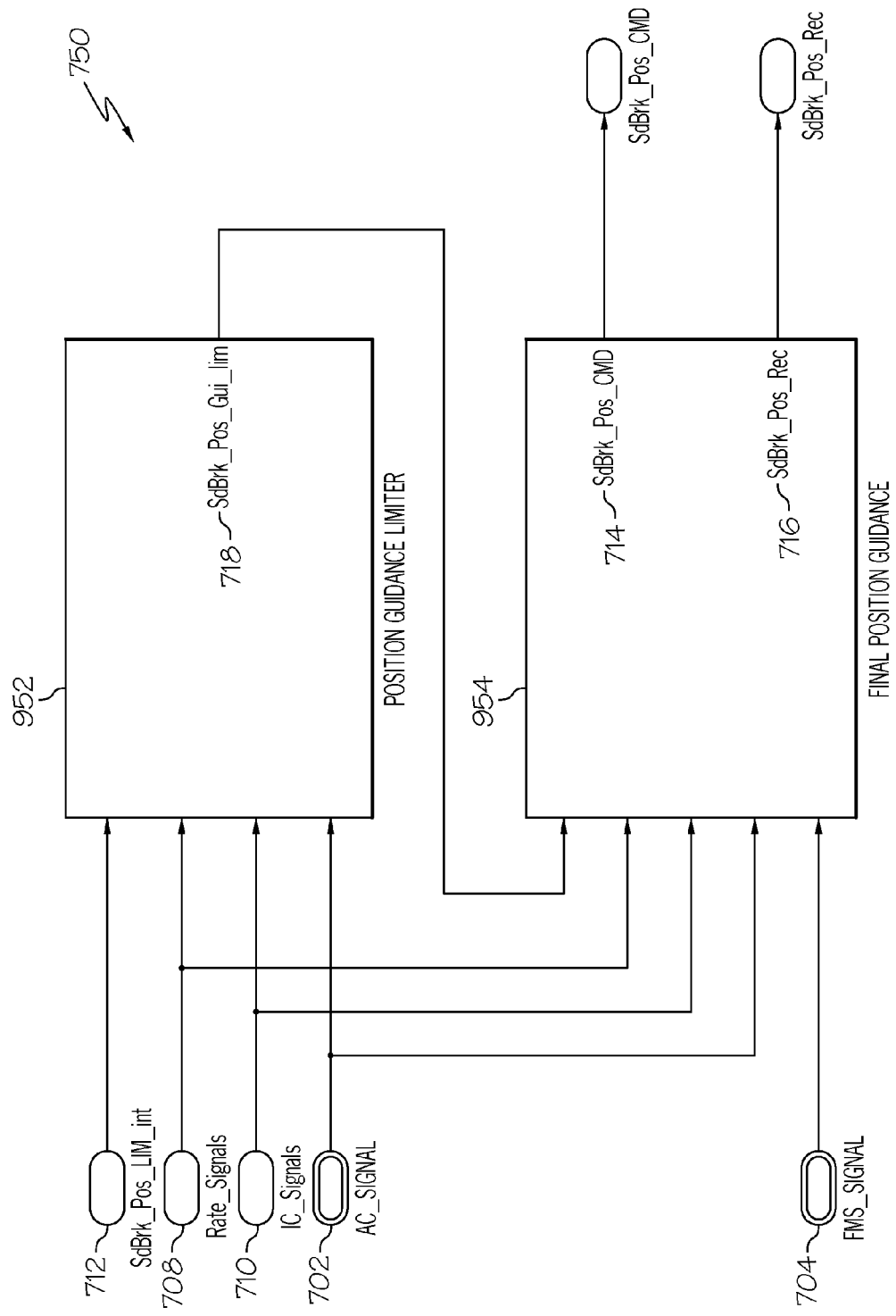
FIG. 9 is a block diagram of a post-processing module of the speed brake control system of FIG. 7 in accordance with an exemplary embodiment.

As shown in FIG. 9, the post-processing module 750 includes a position guidance limiter module 952 and a final position command module 954. The position guidance limiter module 952 particularly receives the speed brake aircraft signals 702; the rate limit signals 708 and the initial condition signals 710 from the pre-processing module 730; and the initial position guidance signals 712 from the controller module 740. In response, the position guidance limiter module 952 provides a limit on the initial position guidance signals 712 to generate a limited speed brake position guidance signal 718. The position command limit signal 718 may be based on, for example, the rate limit signals 708 that constrain the rate at which the speed brake 162 may be applied. The limited speed brake position guidance signal 718 may also be a function of how the speed brake guidance is expressed. For example, if the speed brake guidance is expressed as a percentage of the application at the speed brake control interface 182, the position command limiter module 952 will limit the limited speed brake position guidance signal 718 to between 0 and 100%.

The final position guidance module 954 receives the limited speed brake position guidance signal 718, and optionally, the rate limit signals 708 and the initial condition signals 710 from the pre-processing module 730, the initial position guidance signals 712 from the controller module 740, and the FMS signals 704 from the navigation system 120. In response, the final position guidance module 954 generates the speed brake guidance, which may include a speed brake position command 714 and a speed brake position recommendation 716. In one embodiment, the speed brake position command 714 is provided to the auto-pilot system 150 for automatically implementing the speed brake position command 714. For example, the auto-pilot system 150 may generate actuator commands for activating and controlling the speed brake 162. The speed brake position recommendation 716 is provided to the display unit 170 for displaying a visual representation of the speed brake guidance to the pilot, such as discussed above with reference to FIGS. 4-6. As also discussed above, the final position guidance module 954 may modify the speed brake position recommendation 716 as necessary or desired for communication with the pilot, such as by generating analog or digital signal in a form corresponding to the display unit. As described above, the speed brake position recommendation 716 may be converted to one of a number of discrete values for ease in implementation or application.

Accordingly, the speed brake guidance, expressed as a command (e.g., command 714) to the auto-pilot system 150 or as a recommendation to the pilot, from the speed brake control system 140 simplifies the pilot's critical decisions during the descent phase of flight by providing well-integrated and operationally-relevant information without the need to guess or estimate an appropriate action with respect to the speed brake 162. For example, the display of the speed brake guidance and the application thereof enables efficient flight of the vertical profile, thereby enhancing the ability of the pilot to fly the desired flight path while attending to other aspects of flight management. As such, exemplary embodiments facilitate flight crew or operator situational awareness and vehicle control, which reduces pilot or operator workload and navigation errors, and thus results in increased aircraft and/or navigation safety.

It is important to note that while exemplary embodiments have been described in the context of a fully functioning aircraft system, exemplary embodiments are further capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for controlling the speed of an aircraft with a speed brake during flight, the system comprising:
a guidance system configured to determine a target speed for the aircraft;
a speed brake control system coupled to the guidance system and configured to compare the target speed to a current speed to generate speed brake guidance; and
a display unit coupled to the speed brake control system and configured to display a visual representation of the speed brake guidance to a pilot of the aircraft.

2. The system of claim 1, wherein the speed brake control system is configured to generate the speed brake guidance when the current speed is greater than the target speed.

3. The system of claim 1, wherein the speed brake guidance includes a speed brake recommendation.

4. The system of claim 1, wherein the speed brake guidance includes a speed brake command.

5. The system of claim 1, further comprising a speed brake control interface coupled to the guidance system and configured to adjust the speed brake when manually adjusted by the pilot, wherein the speed brake guidance includes a recommended position of the speed brake control interface.

6. The system of claim 1, further comprising a speed brake control interface configured to be selectively positioned in a first position at which the speed brake is not applied, a second position at which the speed brake is completely applied, and an intermediate position at which the speed brake is partially applied, wherein the speed brake guidance includes a recommendation for the intermediate position.

7. The system of claim 1, wherein the display unit includes a series of lights, and wherein the visual representation of the speed brake guidance includes activation of one or more of the series of lights, each representing a recommended amount of application of the speed brake.

8. The system of claim 1, wherein the speed brake control system includes a pre-processing module, a controller module, and a post-processing module.

9. The system of claim 8, wherein the pre-processing module is configured to receive a flight path angle and to determine a rate limit signal based on the flight path angle that limits the speed brake guidance.

10. The system of claim 9, wherein the pre-processing module is configured to receive a current altitude and the current speed and to enable the speed brake control system based on the current speed and the current altitude.

11. The system of claim 9, wherein the controller module is configured to receive the current speed and to generate an initial speed brake guidance signal based on the current speed.

12. The system of claim 11, wherein the post-processing module is configured to limit the initial speed brake guidance signal based on the rate limit signal to generate the speed brake guidance.

13. The system of claim 1, further comprising an auto-pilot system coupled to the speed brake control system and configured to generate actuator commands based on the speed brake guidance.

14. A method for controlling the speed of an aircraft with a speed brake, comprising the steps of:
   receiving a current speed; comparing the current speed to a target speed;
   generating speed brake guidance based on the comparison; and
   displaying the speed brake guidance to a pilot for controlling the speed of the aircraft.

15. The method of claim 14, wherein the generating step includes generating the speed brake guidance with a speed brake recommendation corresponding to a position of a speed brake control interface.

16. The method of claim 14, wherein the display step includes displaying an amount of the speed brake recommended to meet the target speed.

17. The method of claim 14, further comprising the step of providing the speed brake guidance to an auto-pilot system configured to automatically implement the speed brake guidance.

18. The method of claim 14, further comprising the step of limiting the speed brake guidance based on a flight path angle.

19. The method of claim 14, wherein the displaying step include displaying the speed brake guidance as a discrete value.

* * * * *